United States Patent
Taniguchi et al.

(10) Patent No.: US 9,297,449 B2
(45) Date of Patent: Mar. 29, 2016

(54) RING GEAR FASTENING STRUCTURE

(75) Inventors: Makoto Taniguchi, Susono (JP); Hiroyuki Shioiri, Numazu (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 201 days.

(21) Appl. No.: 13/580,087

(22) PCT Filed: May 18, 2010

(86) PCT No.: PCT/JP2010/058391
§ 371 (c)(1),
(2), (4) Date: Aug. 20, 2012

(87) PCT Pub. No.: WO2011/145179
PCT Pub. Date: Nov. 24, 2011

(65) Prior Publication Data
US 2012/0329599 A1  Dec. 27, 2012

(51) Int. Cl.
*F16H 48/38* (2012.01)
(52) U.S. Cl.
CPC .......... *F16H 48/38* (2013.01); *F16H 2048/382* (2013.01); *F16H 2048/385* (2013.01)
(58) Field of Classification Search
CPC .............. F16H 57/043; F16H 57/0431; F16H 57/0427; F16H 57/0428; F16H 57/0495; F16H 2048/385; B23P 15/14
USPC ................ 74/446, 448, 467; 29/893.1, 893.2; 184/6.12
See application file for complete search history.

(56) References Cited

U.S. PATENT DOCUMENTS

| | | | | | |
|---|---|---|---|---|---|
| 1,200,203 | A | * | 10/1916 | Kroyer | 74/465 |
| 2,121,214 | A | * | 6/1938 | Vandervoort | 184/6.12 |
| 3,033,597 | A | * | 5/1962 | Miller | 403/15 |
| 3,363,478 | A | * | 1/1968 | Lanning | 74/446 |
| 5,038,628 | A | * | 8/1991 | Kayama | 74/339 |
| 6,053,060 | A | * | 4/2000 | Tumberlinson et al. | 74/7 R |
| 6,146,304 | A | | 11/2000 | Bendtsen | |
| 6,425,455 | B1 | * | 7/2002 | Kurokawa et al. | 180/444 |
| 7,025,704 | B2 | * | 4/2006 | Yasuda et al. | 475/323 |
| 7,117,598 | B2 | * | 10/2006 | Prucher | 29/893.2 |
| 7,314,031 | B2 | * | 1/2008 | Le Troadec et al. | 123/90.6 |
| 7,618,338 | B2 | * | 11/2009 | Greenwood | 474/93 |
| 2009/0280946 | A1 | | 11/2009 | Matsuda et al. | |

FOREIGN PATENT DOCUMENTS

| | | |
|---|---|---|
| EP | 0 647 789 B1 | 4/1995 |
| FR | EP0647789 * | 4/1995 |

(Continued)

OTHER PUBLICATIONS

International Search Report of PCT/JP2010/058391 mailed Jul. 13, 2010.

*Primary Examiner* — William Kelleher
*Assistant Examiner* — Emily Cheng
(74) *Attorney, Agent, or Firm* — Kenyon & Kenyon LLP (57) ABSTRACT

Disclosed is a ring gear fastening structure in which a ring gear is fastened to the flange of a differential case configuring a differential sub-assembly. The inner circumferential surface of the ring gear is press-fitted into the outer circumferential surface of the flange, and the ring gear is swaged by means of a swage part which is disposed on at least one end of the flange in the axial direction. The inner circumferential surface of the ring gear is formed with a circumferential groove which extends in the circumferential direction of said inner circumferential surface. The circumferential groove is disposed facing the outer circumferential surface of the flange.

1 Claim, 9 Drawing Sheets

(56) References Cited

FOREIGN PATENT DOCUMENTS

| JP | 55-075515 U | 5/1980 |
| JP | 59-157149 U | 10/1984 |
| JP | 61-036747 U | 3/1986 |
| JP | 03-022153 U | 3/1991 |
| JP | 7-042713 A | 10/1995 |
| JP | 8-320059 A | 12/1996 |
| JP | 09-001402 A | 1/1997 |
| JP | 2002-533627 A | 10/2002 |
| JP | 2009-270616 A | 11/2009 |

* cited by examiner

RING GEAR FASTENING STRUCTURE

CROSS-REFERENCE TO RELATED APPLICATIONS

This is a 371 national phase application of PCT/JP2010/058391 filed on 18 May 2010, the entire contents of which are incorporated herein by reference.

FIELD OF THE INVENTION

The present invention is related to a differential sub-assembly mounted on a vehicle, and more particularly, to a ring gear fastening structure fastening a ring gear to a differential case constituting a differential sub-assembly.

BACKGROUND OF THE INVENTION

Heretofore, as one example of techniques in this field, Patent Documents 1 to 4 listed below disclose that a ring gear is press-fitted into an outer circumference of a differential case for fastening the ring gear to the differential case. Especially, Patent Document 1 discloses the technique that a ring gear is press-fitted in a flange of a differential case, and after that, inner peripheral edges at opposite ends of the ring gear are swaged or deformed by swaging or deforming parts at both ends of the flange so as to fix the ring gear. Then, predetermined components as well as the ring gear are assembled to the case, and a differential sub-assembly used for a power transmission mechanism of a vehicle is obtained.

RELATED ART DOCUMENTS

Patent Documents

Patent Document 1: EP0647789B1
Patent Document 2: JP09(1997)-14402A
Patent Document 3: JP2009-270616A
Patent Document 4: JP2002-533627A
Patent Document 5: JP08(1996)-320059A
Patent Document 6: JP07(1995)-42713A

SUMMARY OF INVENTION

Problems to be Solved by the Invention

Figure 9:
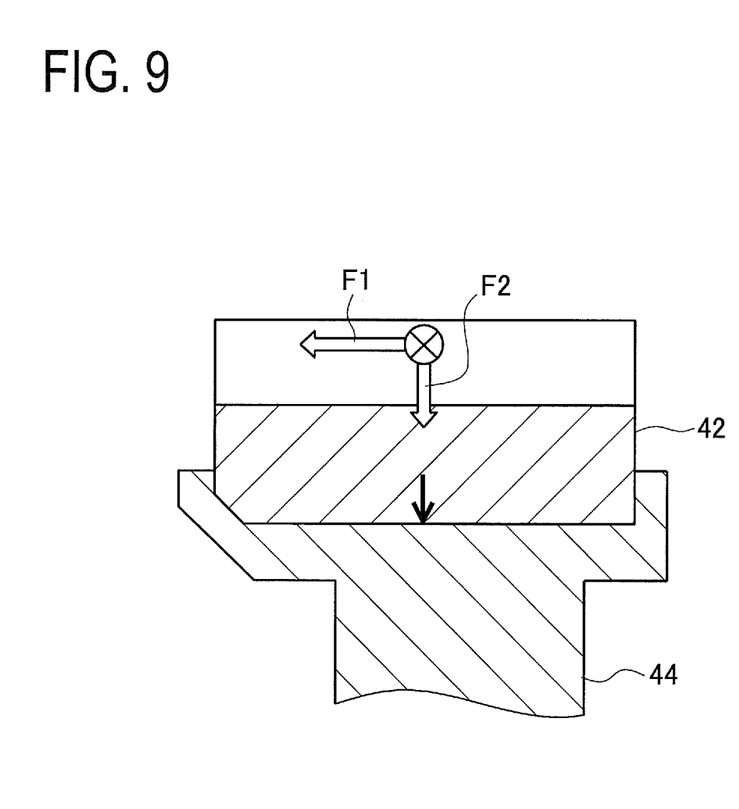
FIG. 9 is a schematic sectional view of a relationship between a differential case and a ring gear after they are fastened in a prior art.
Figure 10:
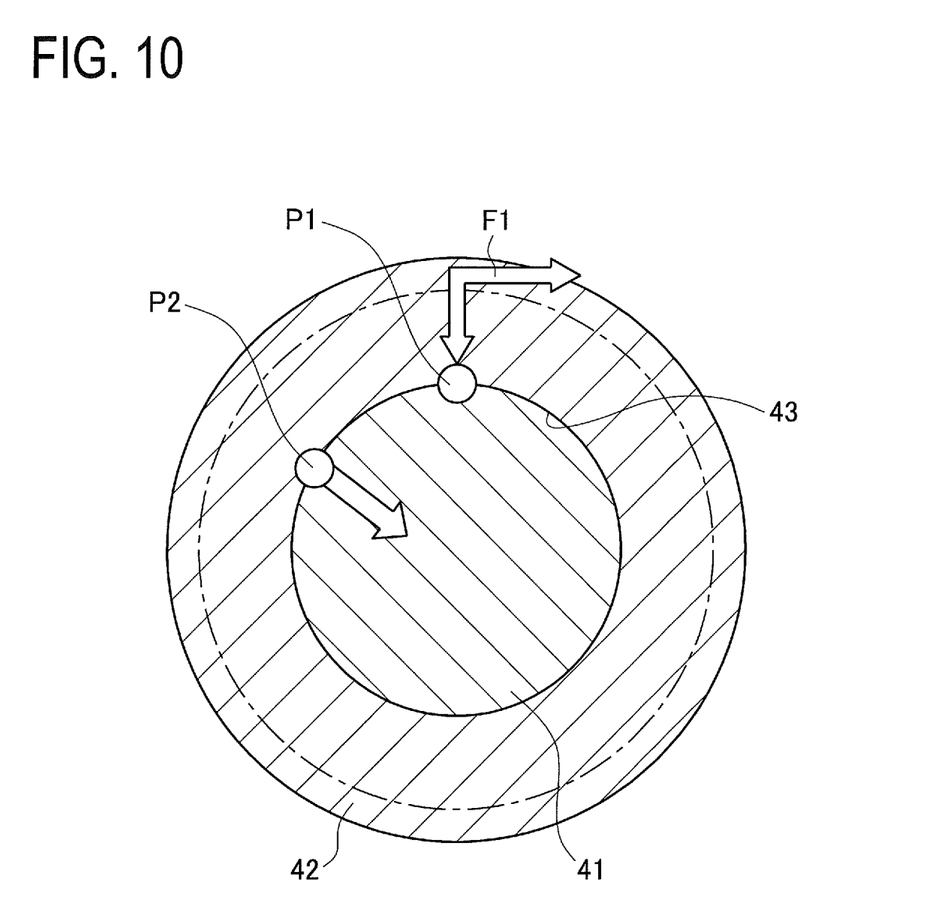
FIG. 10 is a schematic sectional view of a relationship between a flange of a differential case and a ring gear in the prior art.
Figure 11:
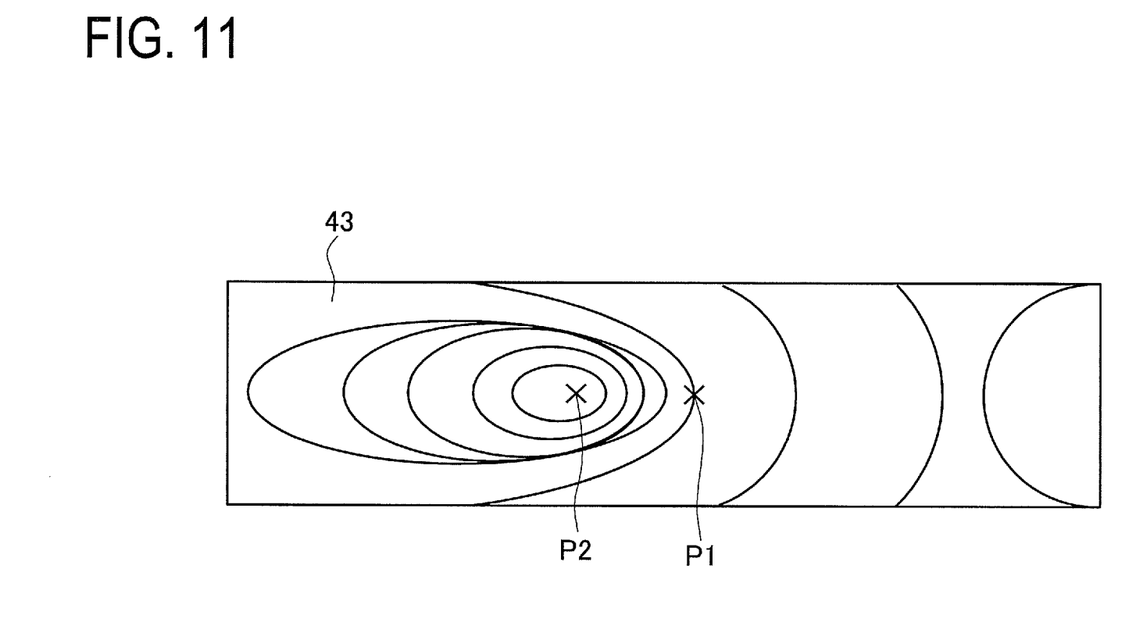
FIG. 11 is an explanatory developed view showing a contact pressure distribution on a press-fitting surface in the prior art.

During use of the differential sub-assembly having the fastening structure disclosed in Patent Document 1 for a power transmission mechanism of a vehicle, however, pressing force pressing an inner circumferential surface (press-fitting surface) of a ring gear is generated by engagement reaction force generated when the ring gear is engaged with a counterpart gear. FIG. 9 is a schematic sectional view of a differential case 41 and a ring gear 42 after they are fastened. FIG. 10 is a schematic sectional view of a flange 44 of the differential case 41 and the ring gear 42. When engagement reaction force F1 is generated on the ring gear 42, a high contact pressure point P2 occurs at a point slightly displaced from a directly-under point P1 of engagement on a press-fitting surface 43 of the ring gear 42. FIG. 11 is an explanatory developed view showing a contact pressure distribution on the press-fitting surface 43. The high contact pressure point P2 is moved on the press-fitting surface 43 as the differential case 41 is rotated, and thereby each portion of the press-fitting surface 43 repeatedly comes into a high contact pressure state and a low contact pressure state in turn. The larger the pressure difference between the high contact pressure and the low contact pressure is, the faster the progress of friction on the press-fitting surface 43 becomes. This may cause generation of particles and decline transmission torque on the press-fitting surface 43.

The present invention has been made to solve the above problems and has a purpose to provide a ring gear fastening structure enabling to reduce the contact pressure on a high contact pressure point of a press-fitting surface of a ring gear with respect to a differential case.

Means of Solving the Problems (1) One aspect of the present invention to achieve the above-mentioned purpose is a ring gear fastening structure in which a ring gear is fastened to a flange of a differential case constituting a differential sub-assembly, wherein an inner circumferential surface of the ring gear is press-fitted on an outer circumferential surface of the flange, the ring gear is swaged by a swaging part provided on at least one of both ends of the flange in an axial direction, the inner circumferential surface of the ring gear being formed with a circumferential groove extending in a circumferential direction of the ring gear, and lubricating oil is filled in the circumferential groove.

According to the configuration described in (1), the differential sub-assembly is obtained by mounting predetermined components as well as the ring gear on the differential case. Therefore, even though the engagement reaction force is generated when the differential sub-assembly is used to a motor transmission mechanism of a vehicle, this reaction force is dispersed by the circumferential groove on the inner circumferential surface of the ring gear. When the ring gear is being press-fitted on the outer circumferential surface of the flange, the lubricating oil filled in the circumferential groove oozes out on the press-fitting surface.

(2) To achieve the above-mentioned purpose, in the aspect described above in (1), it is preferable that the circumferential groove is formed so as to divide the inner circumferential surface of the ring gear into two.

According to the configuration described in (2), the engagement reaction force of the ring gear is divided into two by the circumferential groove in accordance with the action described in (1).

Effects of the Invention

According to the configuration of the present invention, contact pressure of a high contact pressure point on a press-fitting surface of the ring gear against a differential case can be reduced. Further, abrasion of the press-fitting surface can be restricted.

DETAILED DESCRIPTION

One embodiment of a ring gear fastening structure according to the present invention is herein described in detail with reference to the accompanying drawings.

Figure 1:
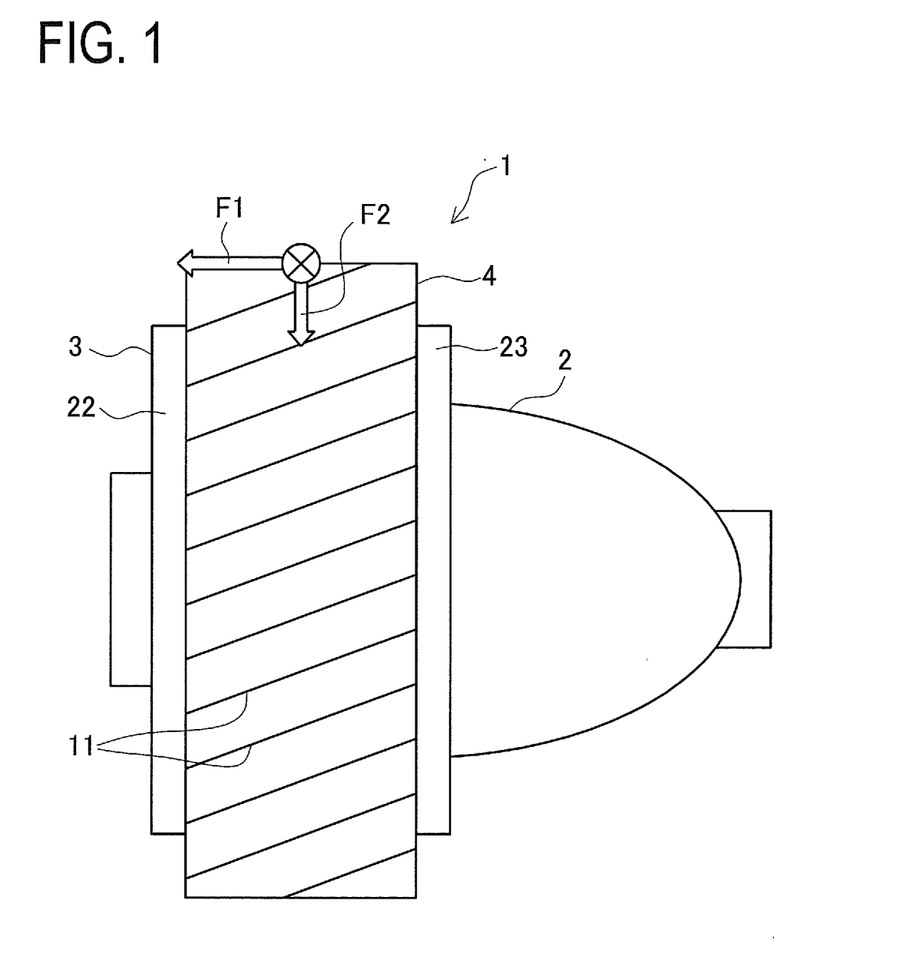
FIG. 1 is a side view showing a schematic configuration of a differential sub-assembly in one embodiment.
Figure 2:
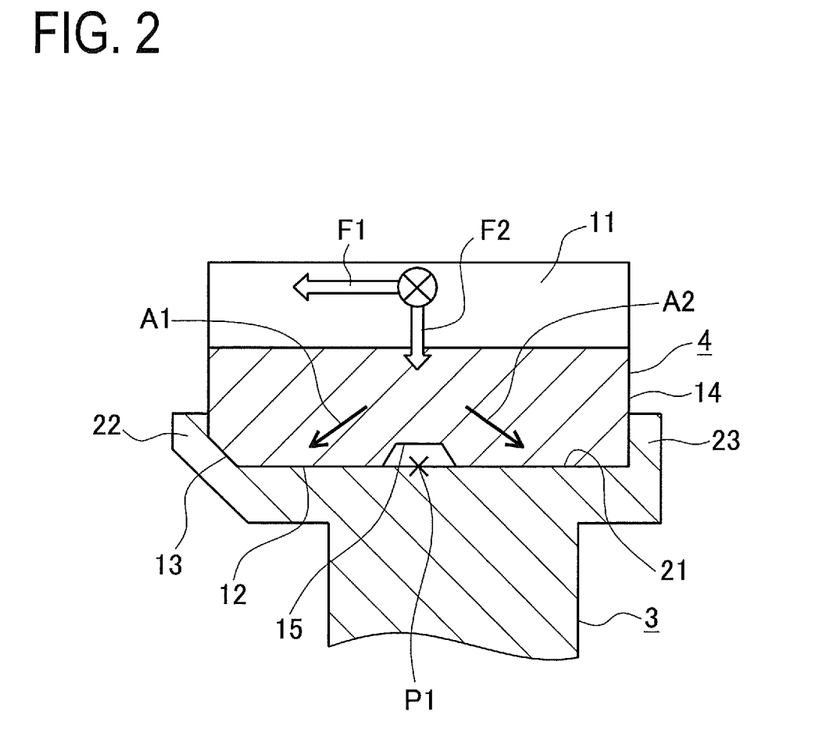
FIG. 2 is a schematic sectional view of a relationship between a flange of a differential case and a ring gear in the embodiment.
Figure 3:
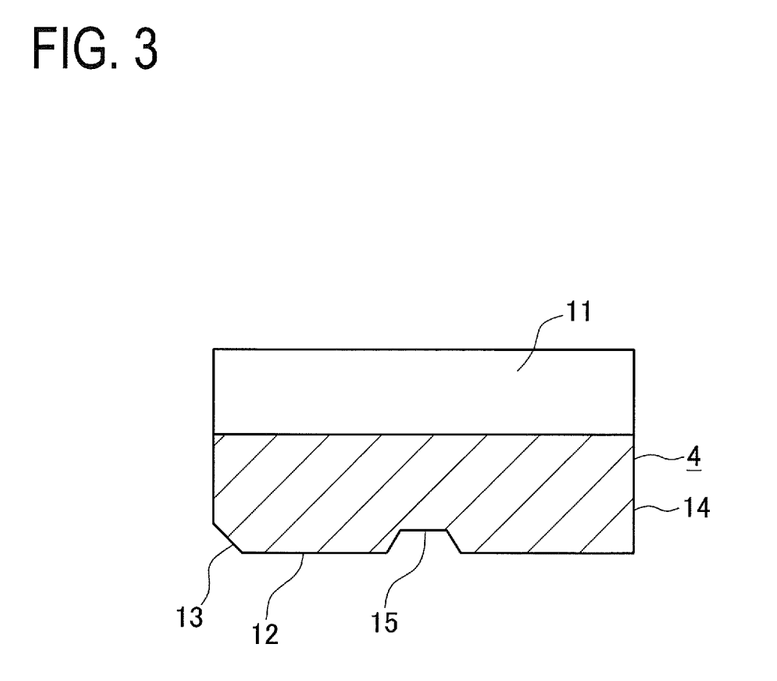
FIG. 3 is a schematic sectional view of the ring gear in the embodiment.

FIG. 1 is a side view showing a schematic configuration of a differential sub-assembly 1. FIG. 2 is a schematic sectional view of a relationship between a flange 3 of a differential case 2 and a ring gear 4. FIG. 3 is a schematic sectional view of the ring gear 4. As shown in FIG. 1, the differential sub-assembly (hereinafter, differential sub-assy) 1 is provided with the differential case 2, the flange 3 provided on one end (left side in the figure) of an outer circumference of the case 2, and the ring gear 4 of an annular shape fastened to an outer circumference of the flange 3. In the case 2, a pair of side gears and a pair of pinions (both are not shown in the figure) are stored and held in a rotatable manner.

This differential sub-assy 1 is used for a power transmission mechanism of a vehicle. For example, the differential sub-assy 1 is provided to a transmission, a transfer, and a final reduction gear of a vehicle. The differential sub-assy1 is to transmit power, which is inputted from a counterpart gear (not shown) to the ring gear 4, to a rotation member connected to the pair of pinions as allowing the rotational difference of the pair of side gears. Herein, the rotation member may be such as a left-and-right pair of driving wheels and a front-and-rear pair of driving axles of a vehicle.

As shown in FIGS. 1 and 2, in the present embodiment, the ring gear 4 is formed of a helical gear in which a plurality of teeth 11 are formed on an outer periphery to be oblique with respect to an axial direction of the ring gear 4. A press-fitting surface 12 as an inner circumferential surface of the ring gear 4 is press-fitted on an outer circumferential surface 21 of the flange 3 as the ring gear 4 is swaged by the flange 3. Specifically, a swaging part 22 is formed on one end (left side in FIG. 2) in an axial direction of the flange 3 and a bank 23 is formed perpendicularly extending on the other end (right side in FIG. 2). The ring gear 4 includes a swaged portion 13 formed at a slant on one end in the axial direction to be swaged by the swaging part 22. The swaged portion 13 is swaged by the swaging part 22 while one end surface 14 of the ring gear 4 is in contact with the bank 23. Further, a circumferential groove 15 is formed extending in a circumferential direction on the press-fitting surface 12 of the ring gear 4. This circumferential groove 15 is formed at a center portion of the press-fitting surface 12 so as to divide the press-fitting surface 12 of the ring gear 4 into almost equally two parts. The circumferential groove 15 is placed to face the outer circumferential surface 21 of the flange 3. Thereby, the ring gear fastening structure fastening the ring gear 4 to the flange 3 of the differential case 2 is configured.

Figure 4:
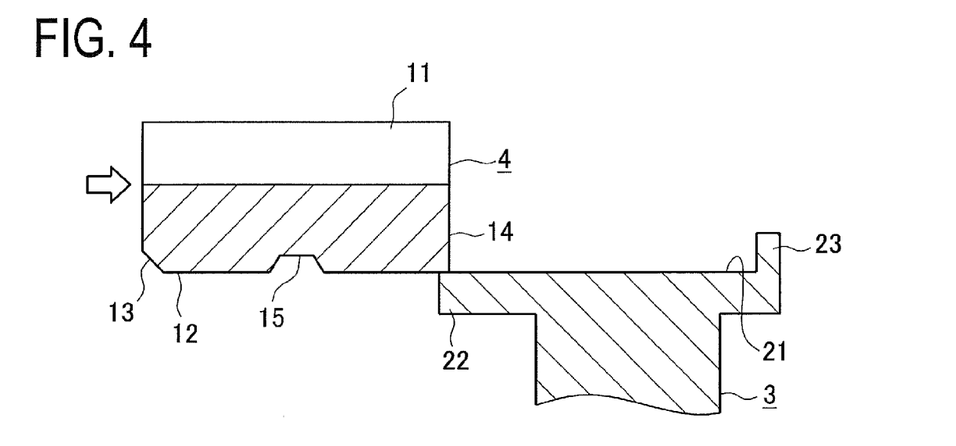
FIG. 4 is a schematic sectional view showing a press-fitting step of a fastening method in the embodiment.
Figure 5:
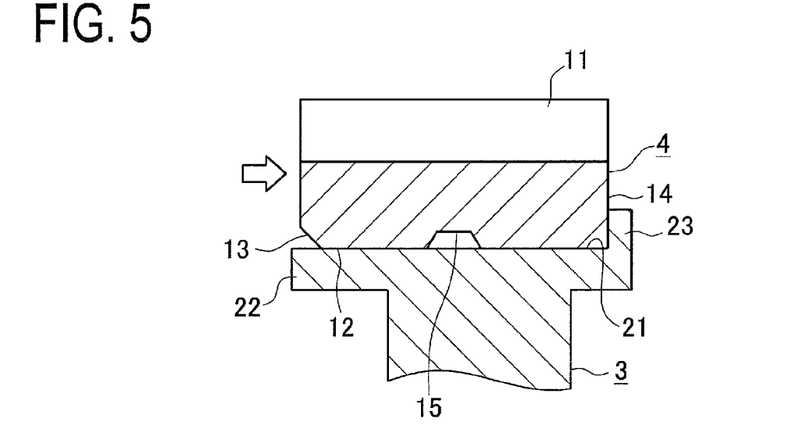
FIG. 5 is a schematic sectional view showing a press-fitting step of the fastening method in the embodiment.
Figure 6:
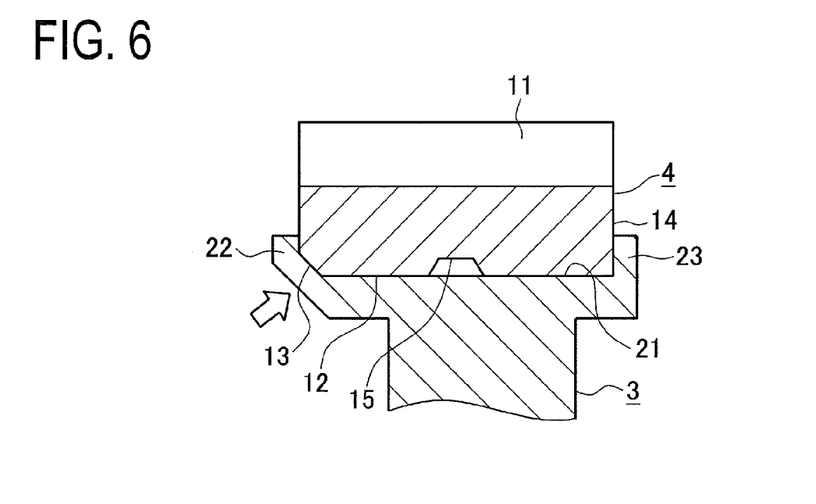
FIG. 6 is a schematic sectional view showing a swaging step of the fastening method in the embodiment.

Next, a ring gear fastening method according to the present embodiment will be described. FIGS. 4 to 6 are schematic sectional views corresponding to FIG. 2, showing each step of fastening method.

First, in a "press-fitting step" as shown in FIGS. 4 and 5, the press-fitting surface 12 of the ring gear 4 is press-fitted on the outer circumferential surface 21 of the flange 3. At this time, the swaging part 22 of the flange 3 is in a horizontally flat shape. Then, the ring gear 4 is pressed until the one end surface 14 comes to contact with the bank 23 so as to be press-fitted as shown in FIG. 5. In this state, the press-fitting surface 12 of the ring gear 4 is in close contact with the outer circumferential surface 21 of the flange 3, and the circumferential groove 15 is located at a center position between the press-fitting surface 12 and the outer circumferential surface 21.

Subsequently, in a "swaging step," the swaging part 22 of the flange 3 is pressed and swaged against the swaged portion 13 of the ring gear 4 as shown in FIG. 6. In this state, the ring gear 4 is positioned in place in the axial direction with respect to the flange 3 and fixed therein.

Figure 7:
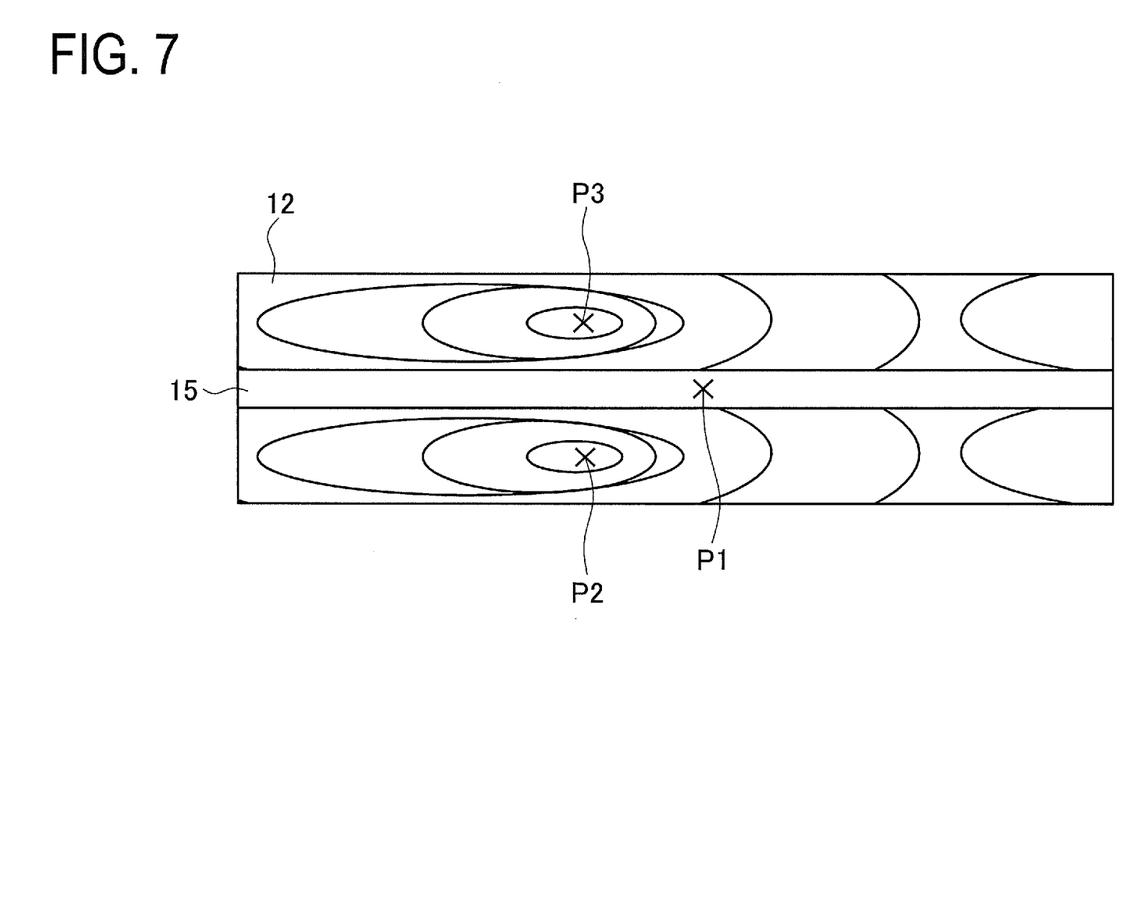
FIG. 7 is an explanatory developed view showing a contact pressure distribution on a press-fitting surface in the embodiment.

According to the ring gear fastening structure in the present embodiment as explained above, when the differential sub-assembly 1 is used for a power transmission mechanism of a vehicle, the engagement reaction force Fl is generated as indicated with arrows in FIGS. 1 and 2 by the engagement of the ring gear 4 and the counterpart gear, and pressing force F2 is further generated on the press-fitting surface 12 of the ring gear 4. However, the circumferential groove 15 is formed at the center of the press-fitting surface 12 of the ring gear 4 in the present embodiment, so that the pressing force F2 mentioned above is divided into two by the circumferential groove 15 as indicated with arrows A1 and A2 in FIG. 2. Therefore, a high contact pressure point which is generated at a position slightly displaced from a directly-under point P1 of engagement is also divided into two as P2 and P3 on the press-fitting surface 12 of the ring gear 4, thus reducing the contact pressure on the high contact pressure point P2. FIG. 7 is an explanatory developed view showing a contact pressure distribution on the press-fitting surface 12. As shown in FIG. 7, the directly-under point P1 of engagement is located in the circumferential groove 15, and the two high contact pressure points P2 and P3 are separately located on both sides of the circumferential groove 15 and slightly displaced from the directly-under point P1 of engagement.

When the differential case 2 is rotated, the high contact pressure points P2 and P3 are moved on the press-fitting surface 12 of the ring gear 4, and each portion of the press-fitting surface 12 repeatedly comes into a high contact pressure state and a low contact pressure state in turn. However, in the present embodiment, the contact pressure on the high contact pressure points P2 and P3 can be reduced, so that the contact pressure differences between the high contact pressure state and the low contact pressure state can be made relatively small. As a result, the ring gear 4 can achieve reduction in abrasion and prevention of particle generation on the press-fitting surface 12, so that reduction in transmission torque from the ring gear 4 to the differential case 2 due to the press-fitting surface 12 can be restricted.

The present invention is not limited to the above mentioned embodiment and can be embodied as follows without departing from the essential scope of the invention.

Figure 8:
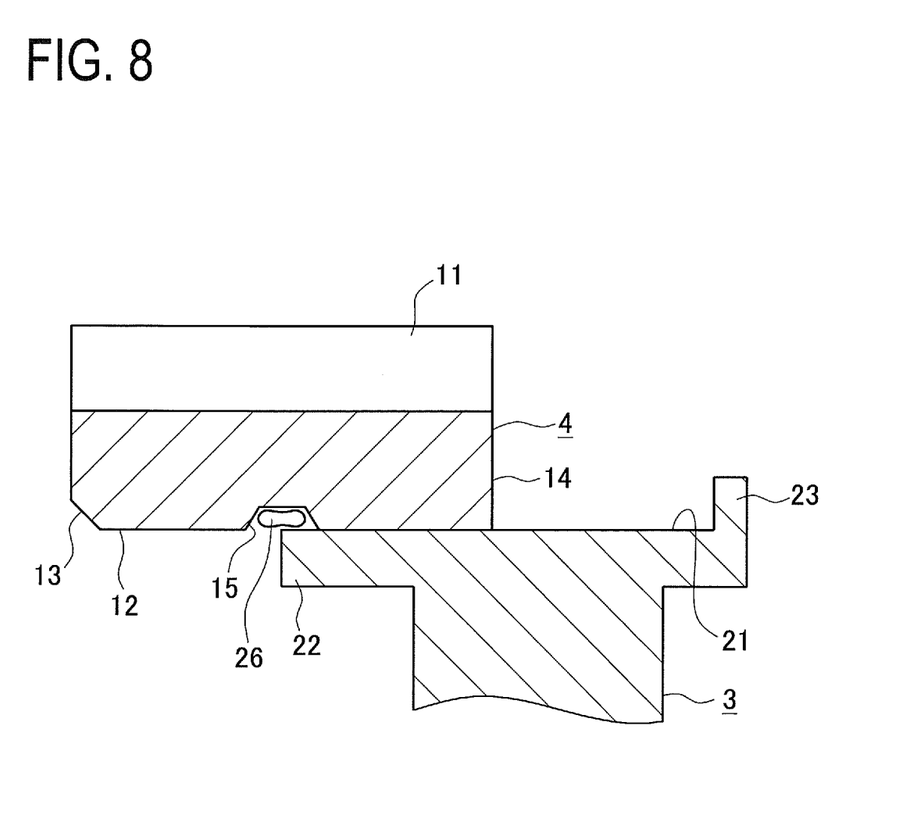
FIG. 8 is a schematic sectional view showing a press-fitting step of a ring gear in another embodiment.

In the above embodiment, the circumferential groove 15 is empty. As an alternative, lubricating oil 26 may be filled in the circumferential groove 15 as shown in FIG. 8 while the ring gear 4 is press-fitted. FIG. 8 is a sectional view of a press-fitting step of the ring gear 4. In this case, when the engagement reaction force F1 is suddenly generated on the ring gear 4 and minute elastic deformation has occurred on the ring gear 4, the press-fitting surface 12 is separated from the outer circumferential surface 21 of the flange 3 at one moment. At this moment, the lubricating oil 26 filled in the circumferential groove 15 oozes out on the press-fitting surface 12, thereby reducing or preventing the abrasion of the press-fitting surface 12.

In the above embodiment, a single circumferential groove 15 is formed at the center of the press-fitting surface 12 of the ring gear 4. As an alternative, a plurality of circumferential grooves may be formed on the press-fitting surface as required.

In the above embodiment, the swaging part 22 is provided on one end in the axial direction of the flange 3. Alternatively, the swaging parts may be provided on both ends in the axial direction of the flange.

INDUSTRIAL APPLICABILITY

The present invention may be applied to a differential sub-assembly used for a power transmission mechanism of a vehicle.

REFERENCE SIGNS LIST

1 Differential sub-assembly
2 Differential case
3 Flange
4 Ring gear
12 Press-fitting surface (Inner circumferential surface)
13 Swaged portion
15 Circumferential groove
21 Outer circumferential surface
22 Swaging part
23 Bank

The invention claimed is:

1. A ring gear fastening structure, comprising:
a ring gear, and
a flange,
    wherein the ring gear is fastened to the flange of a differential case constituting a differential sub-assembly,
    wherein the ring gear includes a tapered portion and the flange includes a swaging part provided on at least one of both ends of the flange in an axial direction,
    wherein the swaging part of the flange is bent around and engaged with the tapered portion of the ring gear, wherein such engagement creates an area of high contact pressure at a circumferential interface between the ring gear and flange,
    wherein the circumferential interface between the ring gear and the flange is formed with a circumferential groove that extends in a circumferential direction of the ring gear and thereby divides the area of high contact pressure into at least two portions, and
    wherein the circumferential groove includes lubricating oil lubricating the circumferential interface at the area of high contact pressure.

* * * * *